(12) United States Patent
Fischer et al.

(10) Patent No.: US 6,652,008 B2
(45) Date of Patent: Nov. 25, 2003

(54) COMPONENT TO COMPONENT SEALING METHOD

(75) Inventors: Steven A. Fischer, Savage, MN (US); Michael A. Stein, Eden Prairie, MN (US); Jeffrey C. Kubesh, Jordan, MN (US); Todd J. Edlund, Savage, MN (US); James Donoho, Golden Valley, MN (US); Eric Soderstrom, Lauderdale, MN (US); Michael Stoick, Prior Lake, MN (US)

(73) Assignee: Entegris, Inc., Chaska, MN (US)

( * ) Notice: Subject to any disclaimer, the term of this patent is extended or adjusted under 35 U.S.C. 154(b) by 0 days.

(21) Appl. No.: 10/169,241
(22) PCT Filed: Dec. 29, 2000
(86) PCT No.: PCT/US00/35537
§ 371 (c)(1), (2), (4) Date: Nov. 25, 2002
(87) PCT Pub. No.: WO01/48413
PCT Pub. Date: Jul. 5, 2001

(65) Prior Publication Data

US 2003/0197382 A1 Oct. 23, 2003

Related U.S. Application Data

(60) Provisional application No. 60/173,905, filed on Dec. 29, 1999.

(51) Int. Cl.[7] ............................................. F16L 25/00
(52) U.S. Cl. ................................. 285/328; 285/334.4
(58) Field of Search ............................. 285/328, 334.4, 285/334.5, 334.3, 382, 332.1, 350

(56) References Cited

U.S. PATENT DOCUMENTS 2,757,966 A  8/1956  Samiran
5,263,312 A  * 11/1993  Walker ..................... 60/39.31
5,370,507 A  12/1994  Dunn et al.
5,890,746 A  * 4/1999  Mueller ..................... 285/92

FOREIGN PATENT DOCUMENTS

GB       143432       1/1920
GB       894181       4/1962

OTHER PUBLICATIONS

International Search Report.

* cited by examiner

*Primary Examiner*—Teri Pham Luu
(74) *Attorney, Agent, or Firm*—Patterson, Thuente, Skaar & Christensen, P.A.

(57) ABSTRACT

A coupling ideally suited for sealing between components such as a fluoropolymer valve body (50) and a fluoropolymer manifold (52) or for coupling tubing end portions, utilizes structure on said components for defining the sealing surfaces. In a preferred embodiment, the coupling comprises a male protruding portion (62), a recessed female receiving portion (64), and a clamping means. The clamping means (92) has an inner threaded surface for engaging a correspondingly threaded portion of the male protruding portion. The male protruding portion is shaped, generally, as a converging rounded conical frustum (65.1) having an exterior surface, a primary sealing surface, a first stop surface (78), a second cooperating stop surface, and a fluid flow duct. The fluid flow duct is preferably concentrically positioned. The recessed portion has a circular perimeter, an inwardly projecting annular ring (74), a first cooperating stop surface, a second stop (82) surface, and a fluid flow duct. The male protruding portion forms a seal by confronting the primary sealing surface and the annular sealing ring.

16 Claims, 8 Drawing Sheets

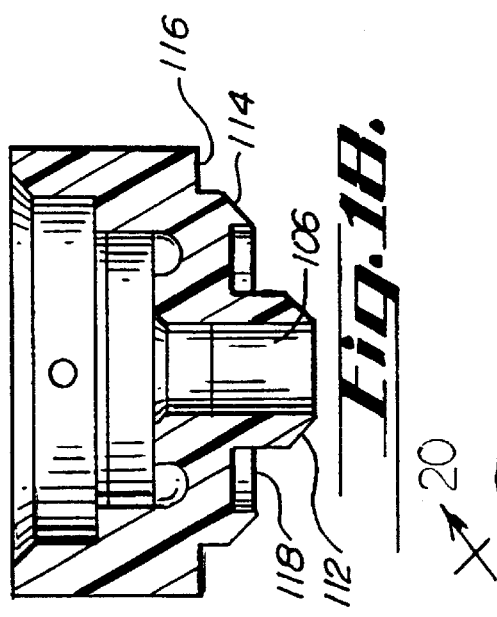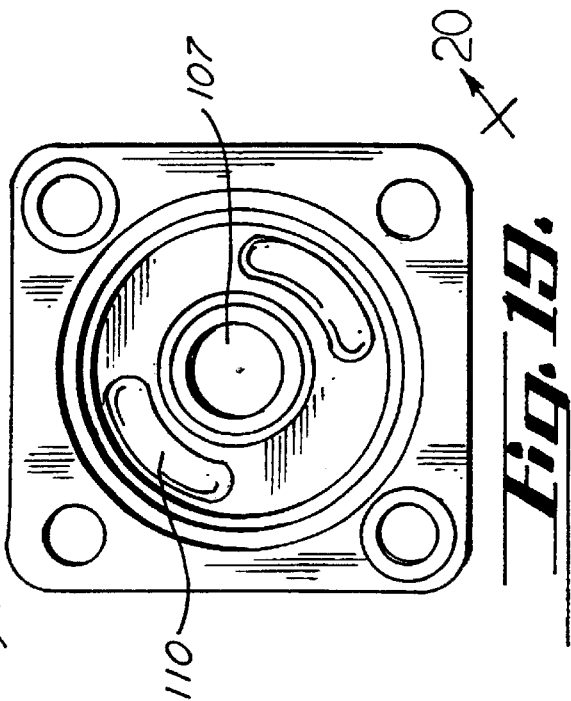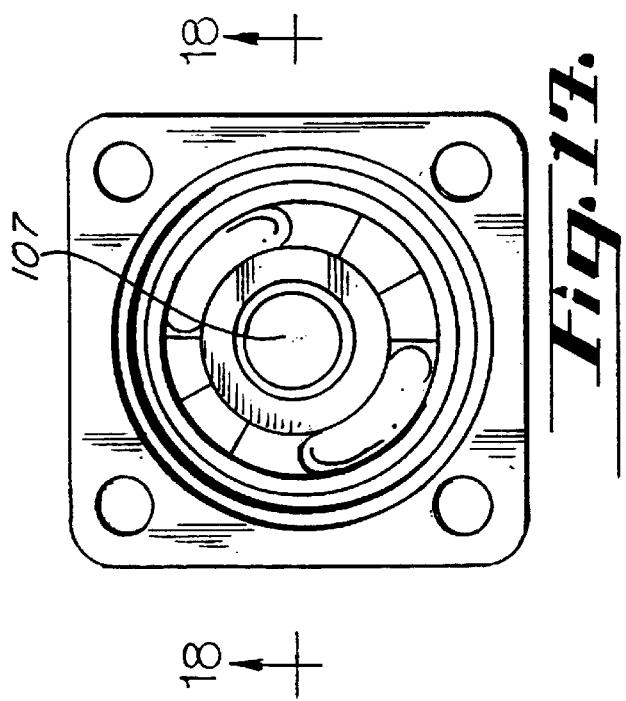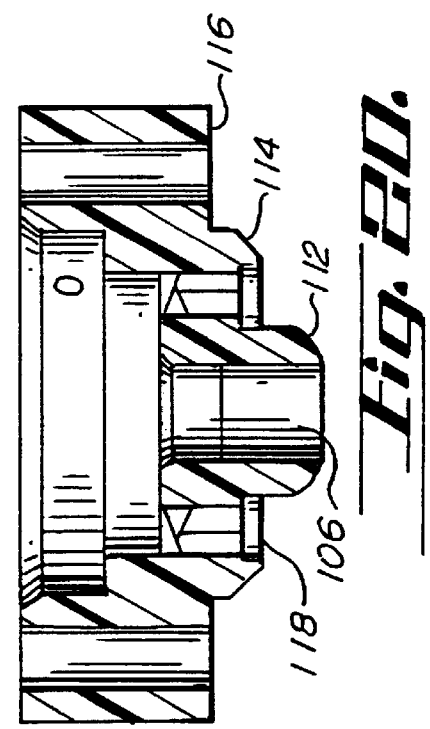

COMPONENT TO COMPONENT SEALING METHOD

This application claims benefit of provisional application No. 60/173905 filed Dec. 29, 1999.

BACKGROUND OF THE INVENTION

This invention relates to fluid flow components; more particularly the invention relates to fluoropolymer couplings.

Numerous industries and many applications utilize metallic tubes, fittings, and various other "plumbing" components for handling and controlling critical fluid flow. Such components may be made of copper, stainless steel, and steel. Where the fluids being handled are under significant pressure or where containment integrity is critical, seals such as O-rings and flexible flat gaskets are typically utilized.

In particular applications such as semiconductor processing, the fluids involved react with and/or may be contaminated by the use of metallic components and conventional gaskets and elastomeric O-rings. Thus, in such industries, plumbing components are made of highly inert materials such as fluoropolymers, i.e., PFA and PTFE, for wetted components. In such applications, elastomeric O-rings are typically formed of two materials with a first traditional elastomeric material, such as silicon, encapsulated in a fluoropolymer coating. These O-rings are expensive and are subject to degradation and are typically considered to be single use.

Various fluoropolymer-based fittings and couplings have evolved for making connections between fluoropolymer components that do not utilize O-rings. Referring to Prior Art FIG. 1, one typical type of fitting is known in the industry as a FLARETEK® fitting. FLARETEK is a registered trademark of Fluoroware, Inc., the assignee of this patent application. In such a fitting 30 the elongate tapered nose section 32 with a threaded neck 34 engages within a tubular end portion 36 which is flared to fit over the tapered nose section. The flared section 38 will have a inside cylindrical surface 40 that has an inside diameter sized for the outside diameter of an outside cylindrical surface 42 of the nose section 32. The nose section thus "telescopes" into the flared section 38. A nut 44 tightens the flared section onto the nose creating a seal 46 between the fitting body and the flared portion of the tubing portion. The flared end of the tubing is generally formed by heating the tubing and shaping the heated malleable tubing end into the desired flared configuration using steel forms.

Various other types of fluoropolymer fittings are known in the art. Some utilize separate gripper portions or internal ferrules. See for example U.S. Pat. Nos. 3,977,708 and 4,848,802. For connections between fluoropolymer valves and components such as fluoropolymer manifolds, sealing integrity between the components is typically accomplished by gaskets or fluoropolymer covered O-rings. In certain instances annular tongue-in-groove connections without O-rings or gaskets have been successfully utilized. These connections have the disadvantage that they must be precisely machined, i.e., tolerances of 0.0005 inches, and it can be difficult to properly align the mating pieces. Moreover, such connections are vulnerable to nicks and scratches which can compromise the integrity of the connection. Such a tongue-in-groove fitting is illustrated by U.S. Pat. No. 5,645,301. U.S. Pat. Nos. 3,977,708, 4,848,802, and 5,645,301 are incorporated herein by reference.

SUMMARY OF THE INVENTION

A coupling ideally suited for sealing between components such as a fluoropolymer valve body and a fluoropolymer manifold or for coupling tubing end portions, utilizes structure on said components for defining the sealing surfaces.

In a preferred embodiment, the coupling comprises a male protruding portion, also referred to as the nose a recessed female receiving portion, and a clamping means. The clamping means has an inner threaded surface for engaging a correspondingly threaded portion of the male protruding portion. The male protruding portion is shaped, generally, as a converging rounded conical frustum having an exterior surface, a primary sealing surface, a first stop surface, a second cooperating stop surface, and a fluid flow duct. The fluid flow duct is preferably concentrically positioned.

The recessed portion has a circular perimeter, an inwardly projecting annular ring, a first cooperating stop surface, a second stop surface, and a fluid flow duct. The fluid flow duct of the recessed portion is configured to cooperate with the fluid flow duct of the male protruding portion in order to form a continuous bore for the flow of fluid. The male protruding portion forms a seal by confronting the primary sealing surface and the annular sealing ring.

An advantage and feature of particular embodiments of the invention is that the male protruding portion is more easily manufactured with tolerances less critical than other known component-to-component sealing systems.

A further advantage and feature of particular embodiments of the invention is that the sealing components are self-centering, thereby facilitating assembly.

A further advantage and feature of the invention is that the base-to-base contact provides a positive stop such that additional torquing of screws does not impact the sealing characteristics of the sealing portions. Moreover, the optimum compression of the annular ring may be set at the contact of the stop surfaces.

A further advantage and feature of the invention is that the loading of the sealing surfaces is at an angle offset from engagement direction. This lessens the credibility of the compression between the components for an effective seal.

BRIEF DESCRIPTION OF THE DRAWINGS

FIG. 17 is a top view of a section of the dual port coupling of FIG. 13.

FIG. 18 is a side cross-sectional view of FIG. 17 taken along line B—B.

FIG. 19 is a bottom view of a section of the dual port coupling of FIG. 13.

FIG. 20 is a side cross-sectional view of FIG. 19 taken along line C—C.

DETAILED SPECIFICATION

The plastic coupling according to the present invention can be used in a variety of applications, such as for coupling two tubular pipe portions for coupling tubular pipe portions to items such as valves or manifolds, or for coupling a valve to a manifold.

Figure 1:
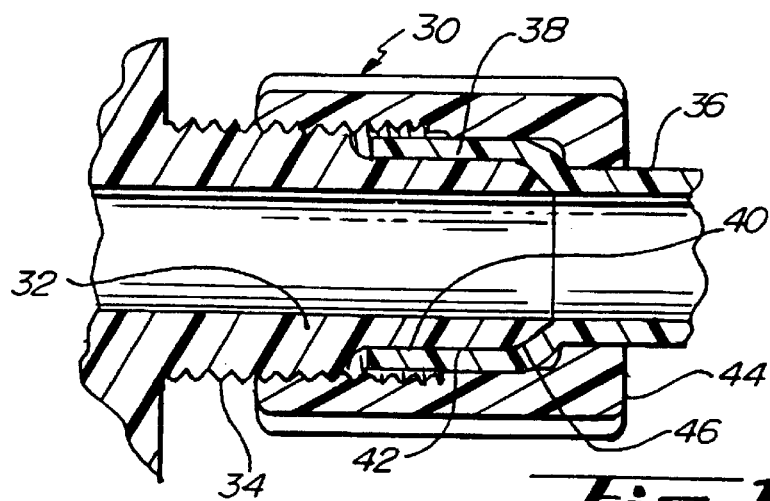
FIG. 1 shows a prior art flared fitting coupling.
Figure 2:
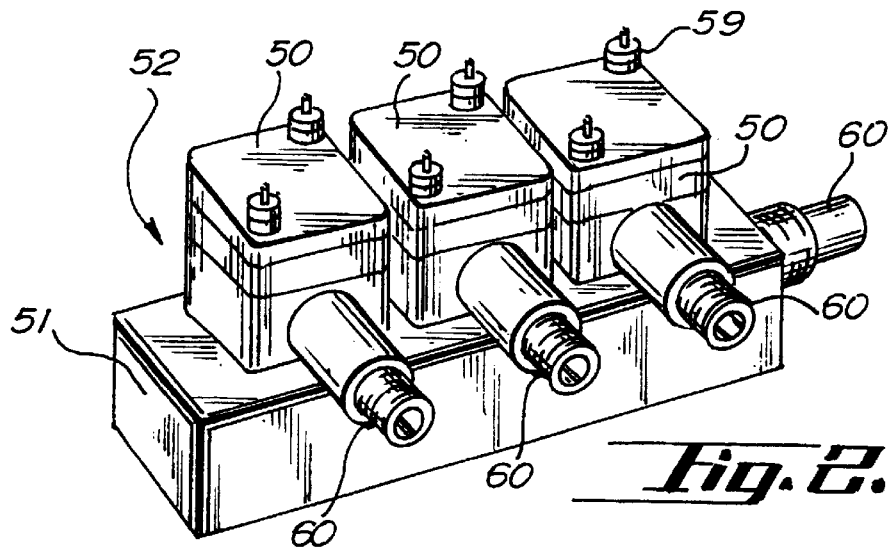
FIG. 2 is a perspective view of a valve manifold and valves in accordance with the invention.
Figure 4:
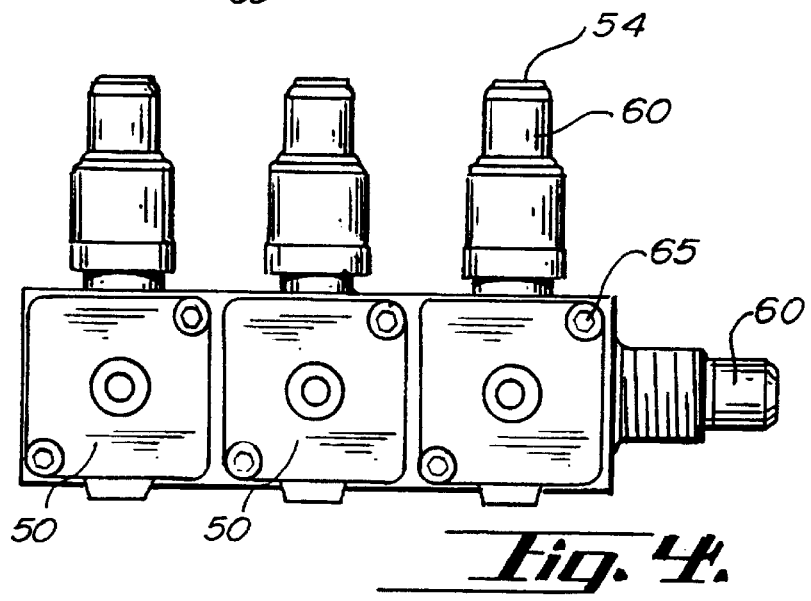
FIG. 4 is a top plan view of the valve manifold of FIG. 2.
Figure 3:
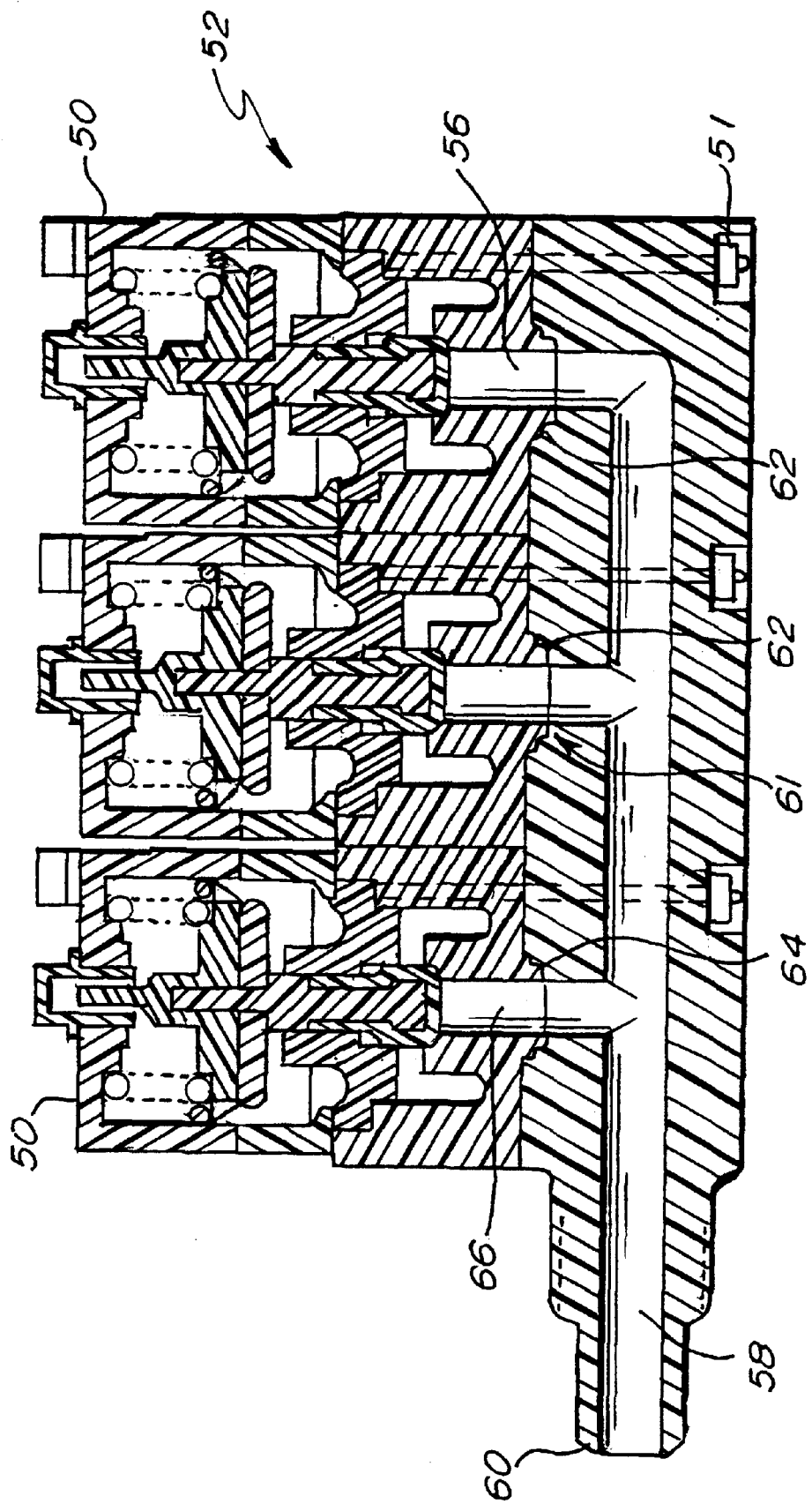
FIG. 3 is a cross-sectional view of the valve manifold and valves of FIG. 2 in accordance with the invention.

Referring to FIGS. 2, 3 and 4, valves 50 mounted on a manifold 52, in accordance with one embodiment of the invention are illustrated. The valves 50, in this embodiment are shown as diaphragm valves conventionally pneumatically operated and have two flow ducts which for purposes of illustration are designated as a fluid inlet 54 and a fluid outlet 56. Obviously, the fluid flow can be in either direction. The manifold 52 may be configured substantially as a block 51 with a fluid flow path 58 extending therethrough. The block manifold 52 at the bore 58 may be connected with a FLARETEK® type coupling 60 known in the industry. Similarly each valve inlet may be suitably attached to tubing by way of FLARETEK® connections 60. The valves 50 of the manifold 52 are, in turn, coupled to the block 51 by a coupling 61 as described hereinbelow and are secured by clamping means 59 such as screws and nuts.

Referring to FIGS. 3, 5, 6, and 7, details of an embodiment of the coupling are illustrated and comprise a male protruding portion 62, configured as a nose and a recessed female receiving portion 64. The nut has an inner threaded surface 90 for engaging a correspondingly threaded portion 88 of the male protruding portion.

The male protruding portion 62 has a flange portion 67, a converging rounded conical frustum 65.1, an axis a1, an exterior surface 68, a primary sealing portion 71, a primary sealing surface 69, a first stop surface 78, a second cooperating stop surface 82 and a fluid flow duct 70. The fluid flow duct in this embodiment is concentrically positioned with respect to the frustum.

The female receiving portion 64 has a recess 65 with a circular periphery 72 and an intermediate portion 69.1, an axis a2, a primary sealing portion configured as a radially and inwardly projecting integral annular ring 74 with a primary sealing surface 75, a first cooperating stop surface 80 configured as upper planar surface, a second cooperating stop surface 76 configured as a lower planar surface, and a fluid flow duct 70. In this embodiment, the annular ring in the cross-section has a corner shape. The fluid flow duct of the recessed portion cooperates with the fluid flow duct of the protruding portion in order to form a fluid flow path 58 for the flow of fluid. Note that the first and second stop surfaces also function as secondary sealing surfaces.

Figure 5:
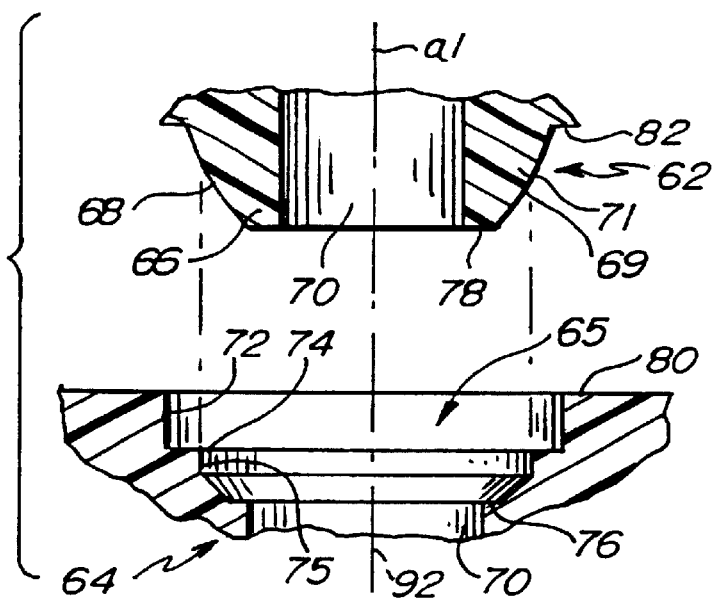
FIG. 5 is an detail cross-sectional view of the male protruding portion and the corresponding recessed female receiving portion of the coupling in accordance with the invention.
Figure 7:
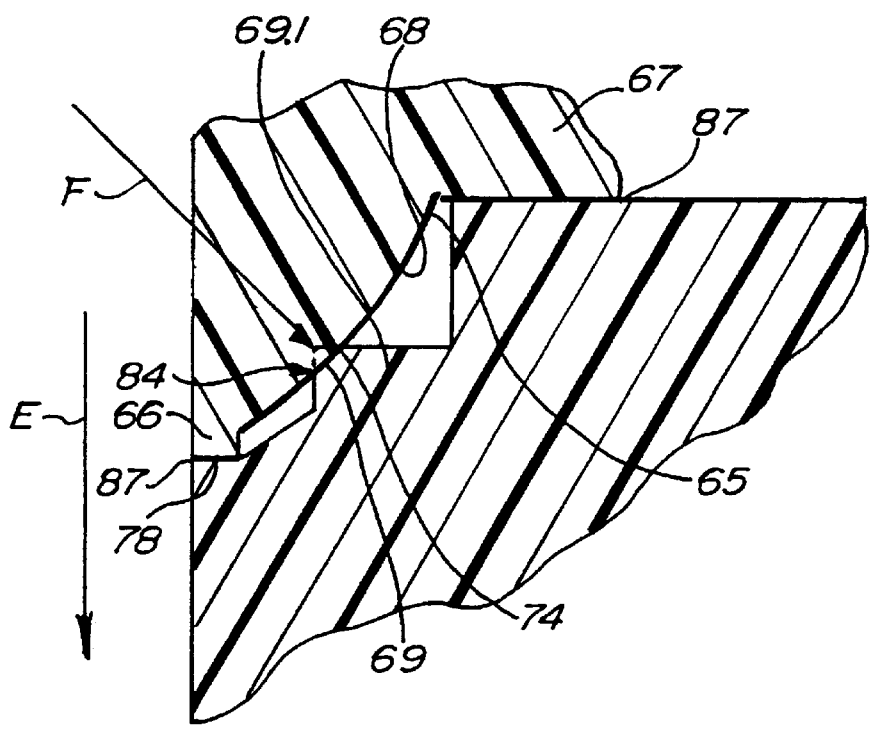
FIG. 7 is a detail cross-sectional view of the male protruding portion of FIG. 5 in full engagement with the recessed female receiving portion.
Figure 6:
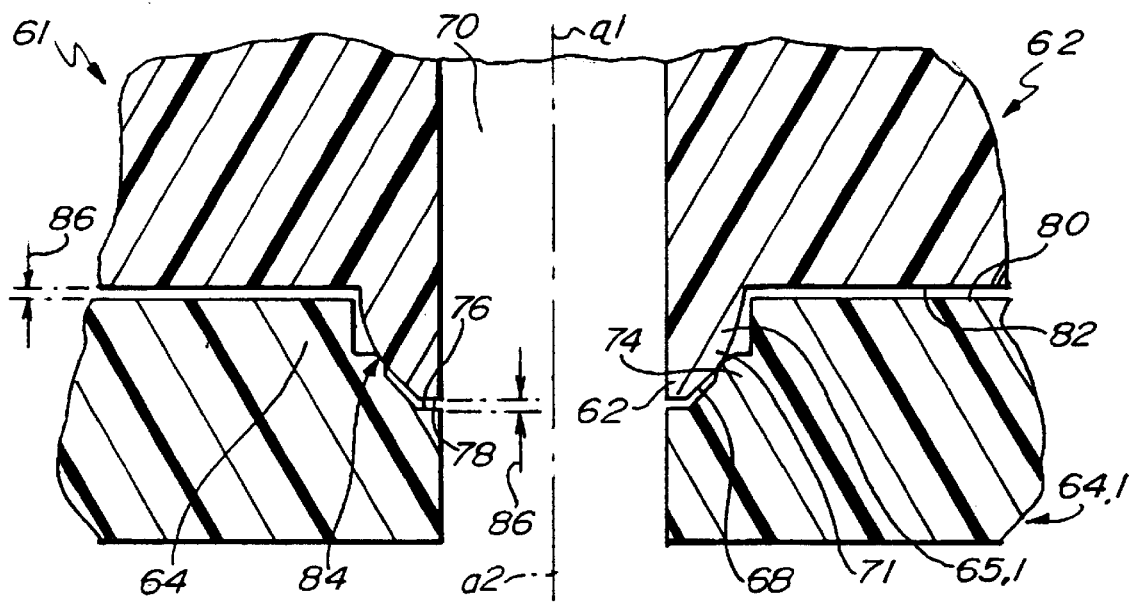
FIG. 6 is a detail cross-sectional view of the male protruding portion of FIG. 5 in partial engagement with the recessed female receiving portion.
Figure 8:
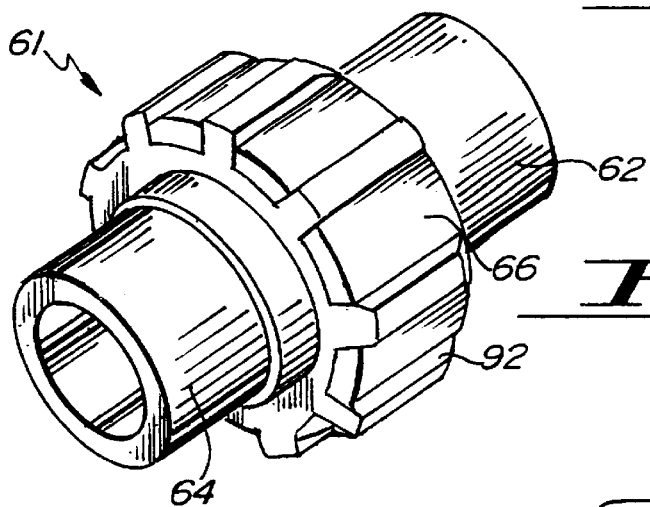
FIG. 8 is a perspective view of an embodiment of the invention for sealing two tubular portions.
Figure 9:
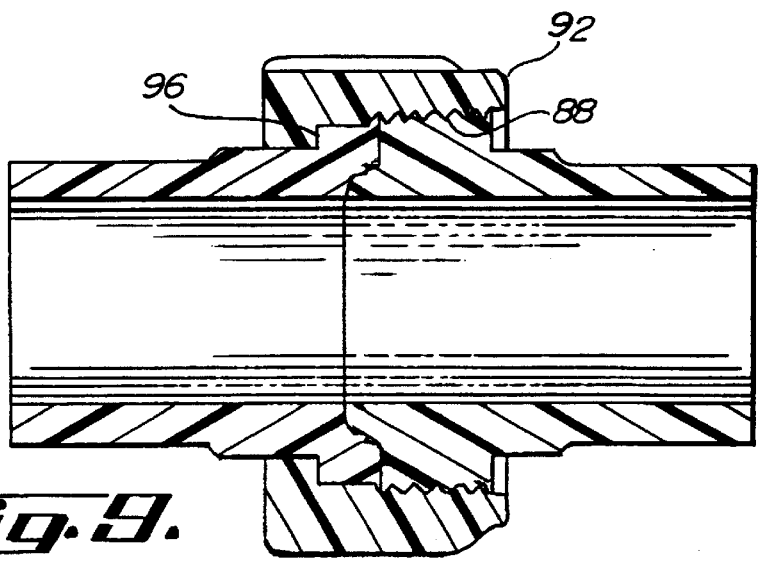
FIG. 9 is a cross-sectional view of the coupling of FIG. 8.

Referring to FIGS. 5, 6 and 7, the components, such as a valve and the manifold are engaged, the male protruding portion 62 confronts the recessed female receiving portion 64 at an interface 84 of the annular ring 74 and the exterior surface 68. As the male protruding portion is inserted into the recessed female receiving portion, as shown in FIG. 6, the annular ring 74 contacts the exterior surface 68. At this point, there is a slight gap 86 present between the second stop surface 76 and the first stop surface 78 as well as between the first cooperating stop surface 80 and the second cooperating stop surface 82.

The seal is accomplished by sliding the clamping means 59 onto the threaded portion 88 of the male protruding portion 62 of the coupling and tightening said clamping means by turning it. As the clamping means is tightened, the gap 86 is narrowed and increasing force is applied on the exterior surface 68 by the annular ring 74 at the interface 84. The clamping means is tightened until the gap 86 is eliminated and the second stop surface 76 contacts the first stop surface 78 and the first cooperating stop surface 80 contacts the second cooperating stop surface 82. When the gap is eliminated, the annular ring 74 experiences a deflection as indicated in FIG. 7. The deflection is due to the confronting force F produced by the exterior surface acting on the annular ring 74. Preferably, the deflection of the annular ring 74 is about 0.0075 inches and any deflection of the exterior surface 68 is negligible.

Figure 22:
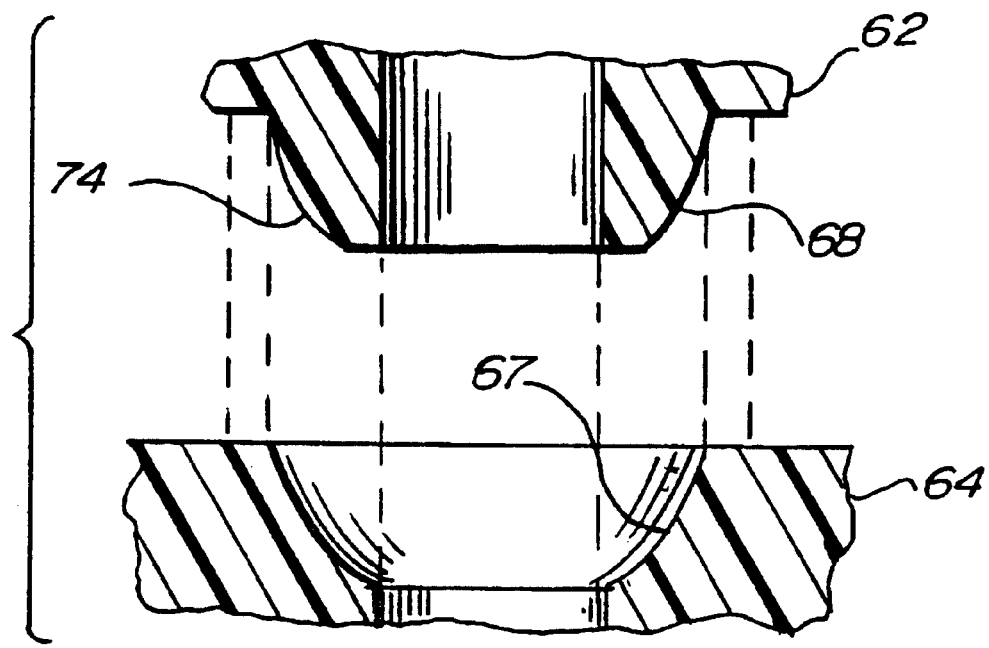
FIG. 22 is a cross-sectional view of an embodiment of the present invention.

In an alternative embodiment, illustrated in FIG. 22, the annular ring 74 may be present on, or integrally formed with, the exterior surface 68 of the male protruding portion 62. In such embodiment, the recessed female receiving portion 64 does not have an annular ring, but rather it has a contacting surface 67 for confronting the annular ring.

Figure 10:
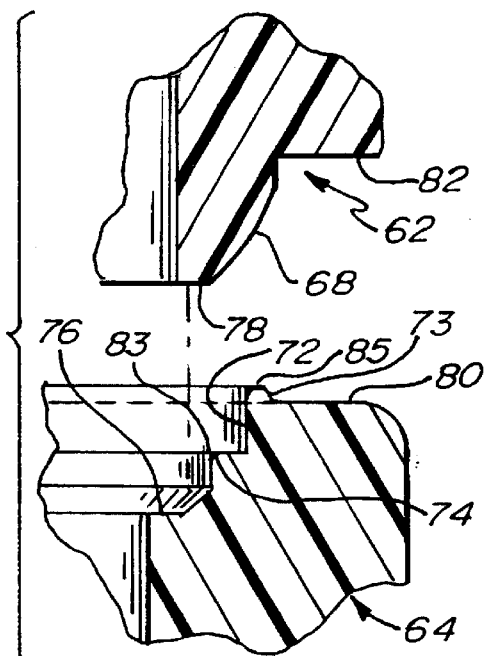
FIG. 10 is a detail cross-sectional view of an embodiment of the invention having two primary seals.
Figure 11:
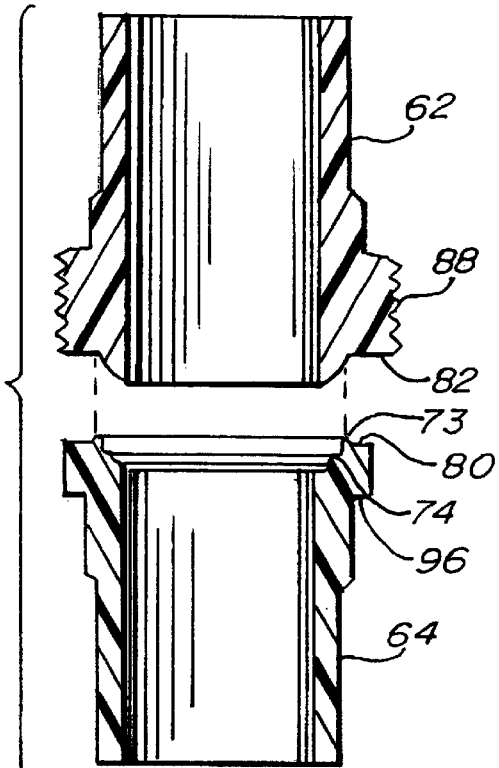
FIG. 11 is a cross-sectional view of the coupling of FIG. 10.
Figure 12:
FIG. 12 is a cross-sectional view of a clamping means in accordance with the invention.
Figure 13:
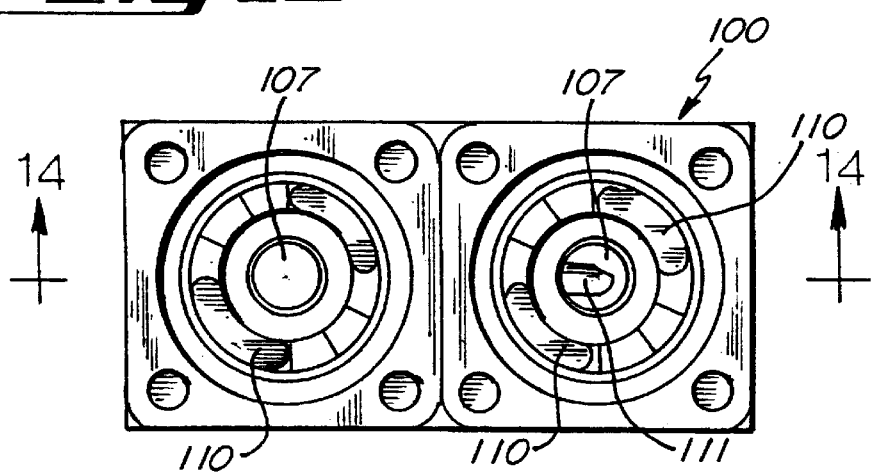
FIG. 13 is top view of a dual port coupling according to an embodiment of the invention.

In another alternative embodiment, illustrated in FIGS. 10–12, a second annular ring 73 is formed on the recesses female receiving portion 64. In such embodiment, no gap is formed between the second cooperating stop surface, 82 and the first cooperating stop surface 80. Instead, the second annular ring 73 contacts the second cooperating stop surface 82 at a second interface 85. As the remaining gap between the first stop surface 78 and the second stop surface 76 is eliminated, a primary seal is formed at both of the first interface 83 and second interface 85.

Referring to FIGS. 5–12 and 22, the force F present at the interface 84 forms a seal of high integrity. The contact between the second stop surface 76 and the first stop surface 78, as well as between the first cooperating stop surface 80 and the second cooperating stop surface 82 forms an additional sealing means. The contact of the respective surfaces 76, 78, 80, 82 provides a positive stop that prevents the user from over tightening the clamping means 59 and impacting the coupling sealing characteristics. Due to the presence of this positive stop, further tightening of the nut will not produce additional force at the interface 84.

The clamping means for coupling two tubular members, shown in FIGS. 8–12, is preferably a threaded nut. The nut 92 has an aperture configured to be constrained with the flanged portion 96 of the female tubular portion 64 when engaged with the of the male tubular portion 62. The nut 92 has an inner threaded surface 90 for engaging the threaded portion 88 of the male tubular portion. Those skilled in the art will recognize that various other clamping means may be used to couple the tubular members, for example a plurality of bolts for clamping a flanged portion of each member.

Referring to FIGS. 2–7, the clamping means used in the manifold does not employ a nut, rather, the valve body 50 is tightened to the manifold 52 with a fastener 65. The fastener is preferably a cap screw that engages a threaded bore in the block 51. However, other suitable clamping means may be used without departing from the spirit or scope of the invention.

As indicated above, the coupling described and claimed herein is self-centering. The first engagement surface 78 of the protruding portion 62 is of smaller diameter than the circular perimeter 72 of the recessed portion 64. Due to the conical exterior surface 68, the protruding portion will be guided into centered alignment with the recessed portion as the two portions are joined.

As shown in FIG. 7, the direction of the force F applied to the corner portion 74 at the interface 84 is offset from the direction of engagement, indicated at E. The amount of offset is a function of the slope of the exterior surface 68.

The seal formed at the interface 84 reduces the need to keep dimensional tolerances very tight.

Another alternative embodiment of the present invention is illustrated in FIGS. 13–21, providing a concentric double nose coupling 100. The concentric double nose coupling is comprised of a male protruding portion 102 and a recessed female receiving portion 104, a first fluid flow passage 106 and a second fluid flow passage 108. The male protruding portion 102, shown in FIGS. 13, 17, 18, 19 and 20, has a first flow opening 107 and a second fluid flow opening 110 for permitting the fluid carried by the tubing to enter the first fluid flow passage 106 and the second fluid flow passage 108 respectively. The second fluid flow passage 108 connects with the first fluid flow passage 106 by a common aperture 111.

In cross sectional views, FIGS. 18 and 20, the male protruding portion 102 has a plurality of circular exterior surfaces. These exterior surfaces are the first primary sealing surface 112, the second primary sealing surface 114, the first stop surface 116 and the second stop surface 118.

Figure 21:
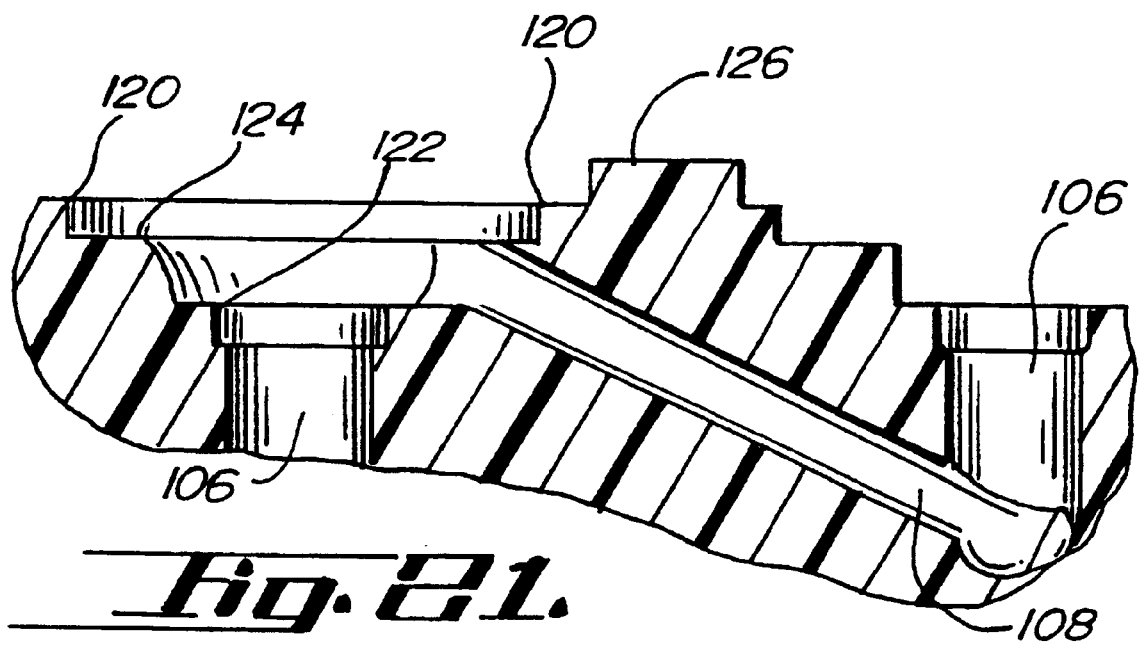
FIG. 21 is a cross-sectional view of the recessed female receiving portion of the coupling of FIG. 15.

Referring to FIG. 21, the recessed female receiving portion has a plurality of sealing features. These features are the first annular ring 120, the second annular ring 122, the first cooperating stop surface 126 and the second cooperating stop surface 124.

Figure 14:
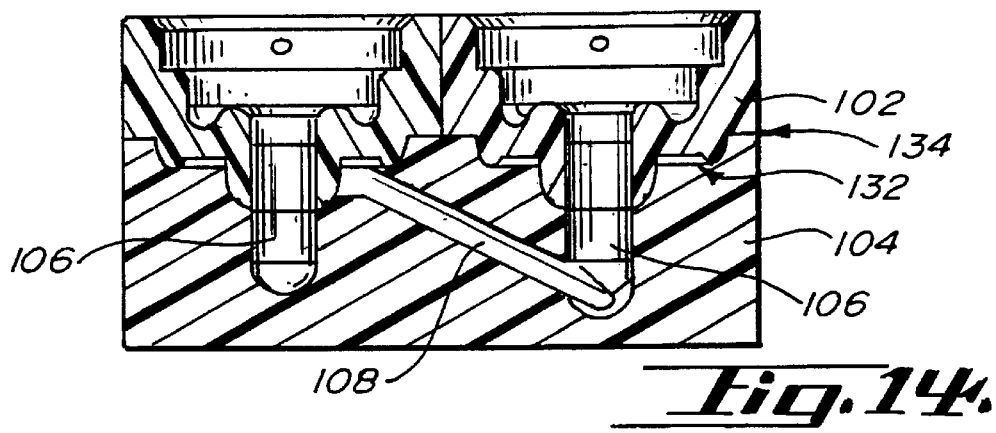
FIG. 14 is a side cross-sectional view of FIG. 13 taken along line A—A.
Figure 15:
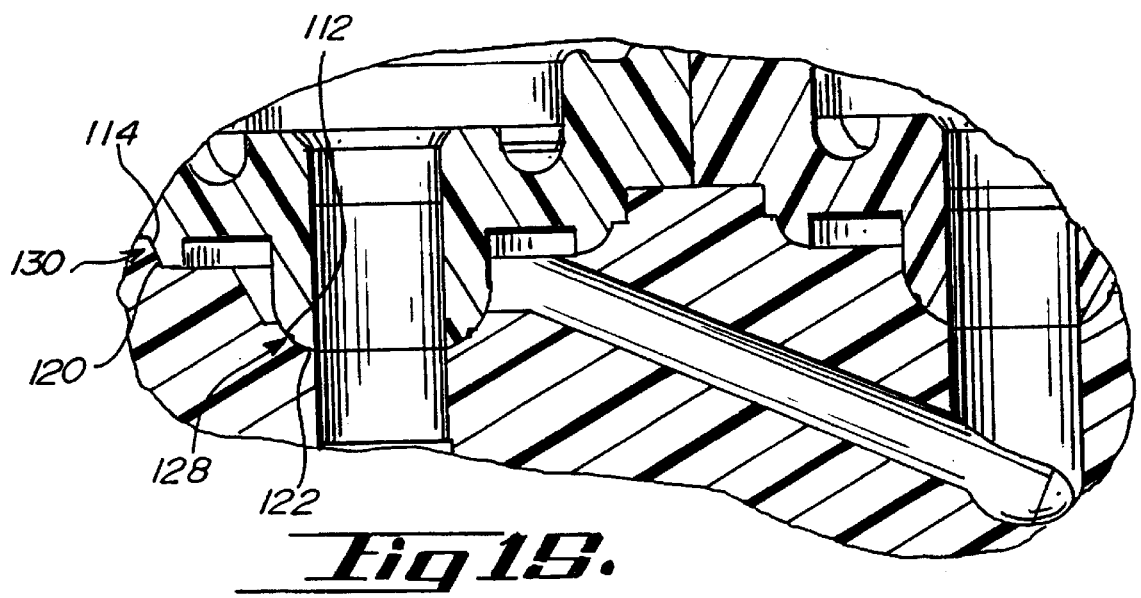
FIG. 15 is a detail cross-sectional view of FIG. 14
Figure 16:
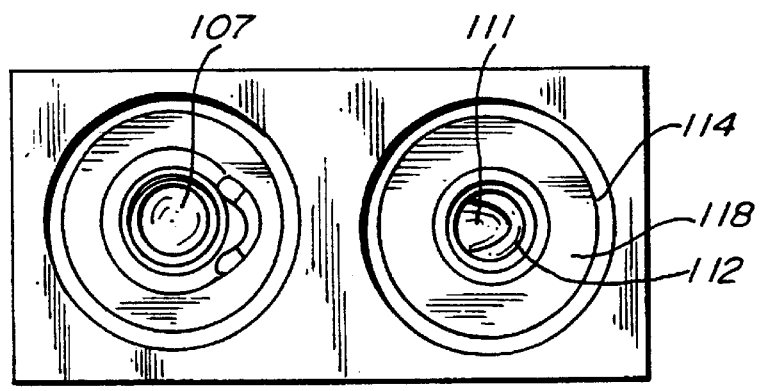
FIG. 16 is a bottom view of a dual port coupling according to an embodiment of the invention.

Referring to FIGS. 14 and 15, the male protruding portion 102 confronts the recessed female receiving portion 104 to make a completed concentric double nose coupling 100. As such confronting occurs, the second annular ring 120 contacts the second primary sealing surface 114 at second interface 130. Simultaneously, first annular ring 122 contacts the first primary sealing surface 112 at first interface 128. When the respective contact is initially made, there is a small first gap 132 between the second cooperating stop surface 124 and the second stop surface 118. A second gap 134 is also present between the first cooperating stop surface 126 and the first stop surface 116.

The male protruding portion 102 and recessed female receiving portion 104 are further forcibly joined by tightening a fastener 136. The fastener is preferably a threaded bolt. The bolt 136 tightens the male protruding portion to the recessed female receiving portion by the engagement of a threaded bore 138 in the recessed female receiving portion. Other suitable fasteners may be used without departing from the spirit or scope of the invention As the fastener 136 forcibly joins the top and bottom portions of the concentric double nose coupling 100, the gaps 132 and 134 reduce until eliminated. At this point, the resting surfaces 124 and 126 are in contact with their respective contacting surfaces 116 and 118. The annular rings 120 and 122 form a seal due to the force generated at the interfaces 128 and 130. As described hereinabove, the annular rings experience a slight deflection due to this forcible contact. The exterior surface of the male protruding portions 102 only experiences a negligible deflection. The direction of the sealing force is offset as a function of the slope of the primary sealing surfaces 112, 114. Additional sealing is provided by the contact between the respective stop surfaces and cooperating stop surfaces.

In an alternative embodiment, the interfaces 128, 130 may be formed sequentially rather than simultaneously. Additionally, the deflections may be of differing amounts and/or the direction of the force at the interfaces may be of different directions.

The couplings according to the various embodiments of the present invention may be formed by injection molding or may be machined. The sealing connection as described above may also be used in other component-to-component connections. In an ideal embodiment, the components to be connected are formed of fluoropolymers such as PFA or PTFE.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

We claim:

1. A coupling for sealingly connecting two components, the coupling comprising:
a male protruding portion attached to one of the components, the male protruding portion having an axis and a bore extending axially through the male protruding portion, the male protruding portion comprising a tip at one end with a first stop surface, a frustum portion extending from the tip, a first flange portion opposite the tip with respect to the frustum, the frustum having an annular primary sealing surface thereon;
and a receiving portion attached to the other of the components, the receiving portion configured for receiving the male protruding portion; the receiving portion comprising
a body portion and a second flange portion, the second flange portion having a stop surface cooperative to the second stop surface of the male protruding portion, the receiving portion having an axis perpendicular to the flange portion, a recess and a bore, the recess extending axially from the flange portion and having a periphery with an intermediate portion that converges inwardly toward the bore, the intermediate portion having an inwardly projecting annular ring integral with the receiving portion, the receiving portion further having a stop surface in the recess adjacent to the bore for cooperating with the first stop surface;
the male protruding portion assemblable with the receiving portion such that the annular ring confronts the annular primary sealing surface of the male protruding portion, and whereby as the male protruding portion is clamped to the receiving portion, the inwardly projecting annular ring is subjected to a compressive force in an oblique direction with respect to the axis of the protruding portion and the coupling having a fully engaged position wherein the first stop surface is engaged with the first cooperating stop surface of the receiving portion and the second stop surface is engaged with the second cooperating stop surface of the receiving portion.

2. The coupling of claim 1, wherein the first stop surface and second stop surface are planar and perpendicular to the axis of the male protruding portion.

3. The coupling of claim 1 wherein the component to which the male protruding portion is attached has a second male protruding portion thereon, and wherein the recess of the receiving portion has a second integral annular ring.

4. The coupling of claim 3 wherein the receiving portion has a flow passage position intermediate the integral annular rings.

5. The coupling of claim 1 wherein the annular ring has a cross-section of a right angle corner with two surfaces.

6. The coupling of claim 4 wherein one of the surfaces is coaxial with the axis of the male protruding portion and the receiving portion.

7. The coupling of claim 1 wherein the male protruding portion is integral with a valve body and the receiving portion is integral with a manifold.

8. The coupling of claim 1 further comprising a clamping means to secure the male protruding portion to the receiving portion.

9. A fluoropolymer coupling comprising:
a male protruding portion having an axis and a bore extending in an axially direction therethrough, a frustum portion extending from the tip with a primary annular sealing surface on the frustum portion, and a first flange portion opposite the tip with respect to the frustum;
and a receiving portion attached to the other of the components, the receiving portion configured for receiving the male protruding portion; the receiving portion comprising
a body portion and a second flange portion, the receiving portion having an axis, a recess, and a bore, the recess extending axially from the flange portion to the bore and having a periphery with an intermediate portion that converges inwardly toward the bore, the intermediate portion having an inwardly projecting annular ring integral with the receiving portion;
the male protruding portion assemblable with the receiving portion such that the annular ring confronts the annular primary sealing surface of the male protruding portion, and whereby as the male protruding portion is clamped to the receiving portion, the inwardly projecting annular ring is subjected to a compressive force.

10. The fluoropolymer coupling of claim 9 wherein the inwardly projecting annular ring is configured and the frustum is configured such that the compressive force on the inwardly projecting annular ring is obliquely oriented with respect to the axis of the protruding portion.

11. The fluoropolymer coupling of claim 9 wherein the male protruding portion comprises a stop surface and the receiving portion comprises a cooperating stop surface, the stop surfaces positioned to engage when the annular ring is subjected to a desired level of compressive force.

12. The coupling of claim 9 wherein the component to which the male protruding portion is attached has a second male protruding portion thereon, and wherein the recess of the receiving portion has a second integral annular ring.

13. The coupling of claim 12 wherein the receiving portion has a flow passage position intermediate the integral annular rings.

14. A fluoropolymer coupling comprising:
a first component having a first male protruding portion having an axis and a bore extending in an axially direction therethrough, the male protruding portion comprising
a tip at one end and a flange portion at the other end, a pair of conical frustums portions positioned coaxially intermediate the tip and the flange portion, each conical frustum portion having a primary sealing surface;
and a receiving portion attached to the other of the components, the receiving portion configured for receiving the male protruding portion; the receiving portion comprising
a body portion and a second flange portion, the receiving portion having an axis, a recess, and a bore, the recess extending axially from the flange portion to the bore and having a periphery with an intermediate portion that converges inwardly toward the bore, the intermediate portion having a pair of inwardly projecting annular rings integral with the receiving portion and each positioned to engage one of the primary sealing surfaces on the conical frustum portion.

15. The fluoropolymer coupling of claim 14 wherein the inwardly projecting annular ring is configured and the frustum is configured such that the compressive force on the inwardly projecting annular ring is obliquely oriented with respect to the axis of the protruding portion.

16. A fluoropolymer coupling comprising:
- a male protruding portion having an axis and a bore extending in an axially direction therethrough, a frustum portion extending from the, and a first flange portion opposite the tip with respect to the frustum;
- and a receiving portion attached to the other of the components, the receiving portion configured for receiving the male protruding portion; the receiving portion comprising
  - a body portion and a second flange portion, the receiving portion having an axis, a recess, and a bore, the recess extending axially from the flange portion to the bore and having a periphery with an intermediate portion that converges inwardly toward the bore;
- an inwardly projecting annular ring integral with one of the frustum portion and the intermediate portion and engageable with the other of the frustum portion and the intermediate portion,
- the male protruding portion assemblable with the receiving portion such that the annular ring is compressed as the male protruding portion is clamped to the receiving portion, the inwardly projecting annular ring is subjected to a compressive force in a direction oblique to the axis of the male protruding portion.

* * * * *